H. J. GAGE, L. EGLESTON, & G. J. SPAULDING.
Machine for Making Harrow-Teeth.
No. 224,526.  Patented Feb. 17, 1880.
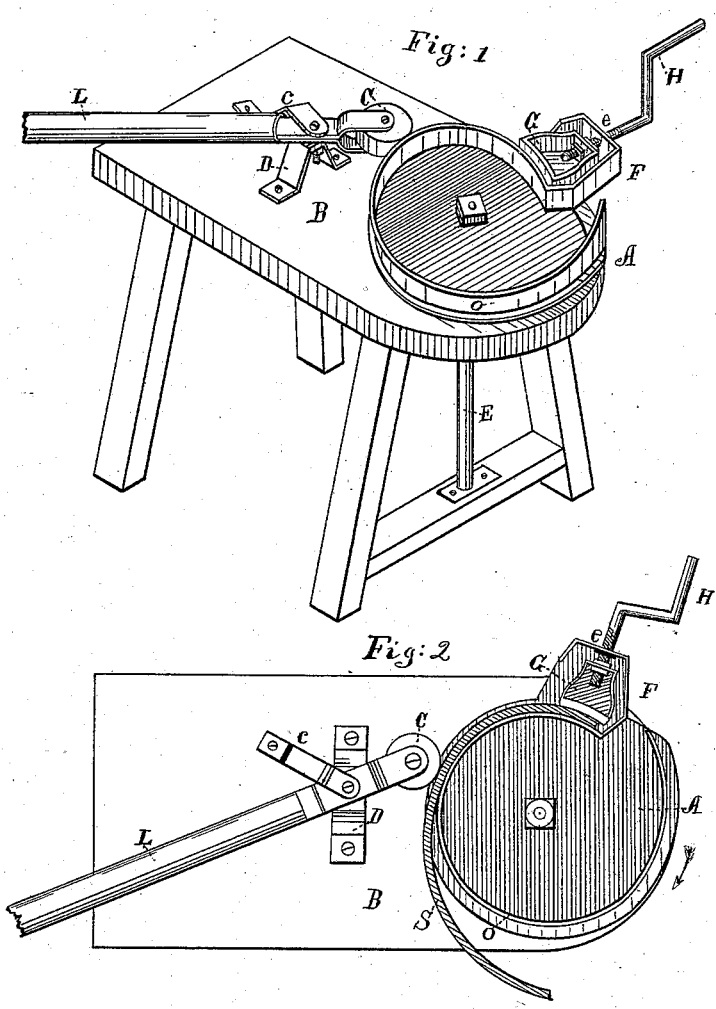

UNITED STATES PATENT OFFICE.

HIRAM J. GAGE, LORENZO EGLESTON, AND GEORGE J. SPAULDING, OF KALAMAZOO, MICHIGAN.

MACHINE FOR MAKING HARROW-TEETH.

SPECIFICATION forming part of Letters Patent No. 224,526, dated February 17, 1880.

Application filed October 23, 1879.

*To all whom it may concern:*

Be it known that we, HIRAM J. GAGE, LORENZO EGLESTON, and GEORGE J. SPAULDING, respectively of Kalamazoo, county of Kalamazoo, State of Michigan, have jointly invented new and useful Improvements in Machines for Making Harrow-Teeth, of which the following is a specification.

Our invention more especially relates to devices for the manufacture of teeth for the implement known as "Reed's Spring-Tooth Harrow."

The object of our invention is the construction and arrangement of a former with its accompaniments, by the use of which said teeth are bent or formed in the peculiar shape desired, said device to be operated by hand or other power.

In the accompanying drawings, forming a part of this specification, in which similar letters of reference indicate like parts, Figure 1 is a perspective view of our device, and Fig. 2 is a top-surface view, in which a tooth partially formed is shown.

A is a plate or frame, shaped around its edge in the form of the tooth desired to be produced, said plate being secured near its circular center to the top of shaft E, said shaft turning in the table top B and cross-piece beneath, in the usual bearings suitable for shafts in machinery. The plate A is located sufficiently far above the table to admit of its turning. On the top face of said plate, one-fourth of an inch (more or less) from its outer edge, rises a rim, O, two inches in width, or other suitable width, substantially as shown in Fig. 1. It is around this rim O that the tooth is formed. G we term a "gripe-block," it being for the purpose of holding one end of tooth S, as seen in Fig. 2, while said tooth is being bent in shape. This gripe-block G is forced against the metal desired to be held by means of a threaded rod swiveled to the same and extending through the side of that portion F of plate A, at *e*, made to hold gripe-block G, said rod being terminated with a crank, H.

This feature of our device comprehends any equivalent mode, in conjunction with former A, receptacle F, and rim O, in combination with the features A F O, and lever L, having wheel C, which will facilitate the holding of the tooth S, as specified and shown.

To the shaft E may be secured or connected pulley or gearing of a suitable nature, so that steam or other power may be applied.

L is a lever, fulcrumed on a stud, D, at a height above the table-top B corresponding with the horizontal plane of former A. In the end of said lever L is placed a wheel, C, having axle and bearings to facilitate its revolving.

The use of lever L, which may be connected with and operated by other than hand-power, we will explain in connection with the operation of the device.

To operate our device, place one end of the metal S between rim O and gripe-block G, and secure it there by turning crank H. Now turn former A by taking hold of crank H, which serves as a handle, in the direction designated by arrow in Fig. 2, taking care to keep the end of lever L, containing wheel C, against the metal S by grasping the opposite end of lever in left hand. The wheel C revolves in the operation, doing away with the friction which would be caused if the blunt end of plain lever engaged the tooth S.

We are aware that revoluble formers provided with griping devices for holding the bar to be bent, also pivoted levers carrying wheels for pressing the bar against the former, are not new. Therefore we do not claim said features broadly; but

What we claim is—

1. The revoluble former A, lever L, provided with wheel C, and gripe-block G, or its equivalents, all combined, constructed, and arranged substantially as specified and shown, and for the purpose set forth.

2. The combination of lever L, provided with wheel C, with revoluble forming-plate A, substantially as specified, and for the purpose set forth.

HIRAM J. GAGE.
LORENZO EGLESTON.
GEORGE J. SPAULDING.

Witnesses:
WILLIAM H. TUTHILL,
S. S. McCAMLY.